Oct. 19, 1943.   W. W. SMITH   2,332,406
CHECK VALVE
Filed Sept. 12, 1941
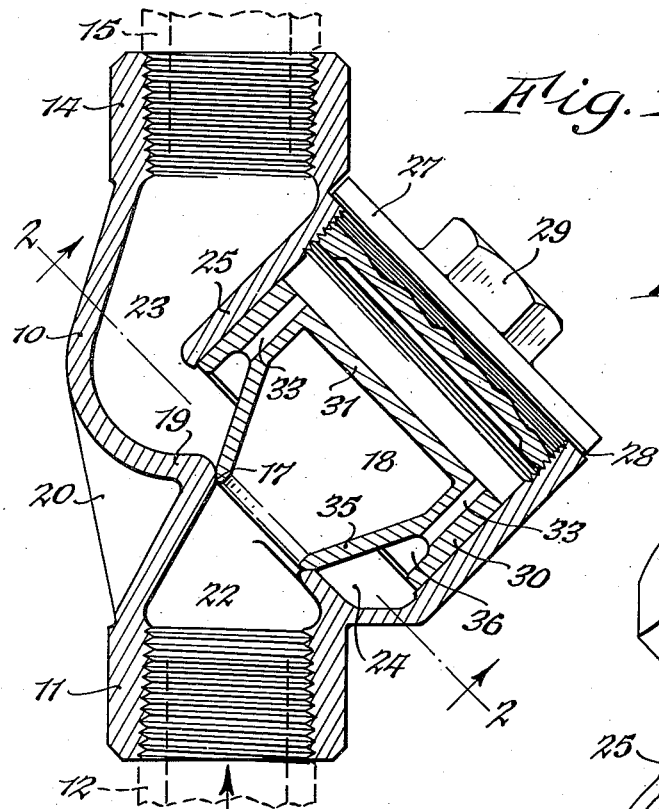
Fig. 1.
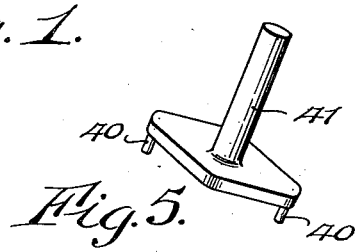
Fig. 5.
Fig. 2.
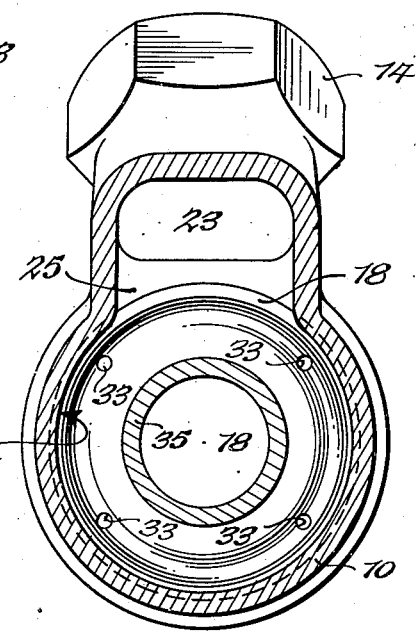
Fig. 3.
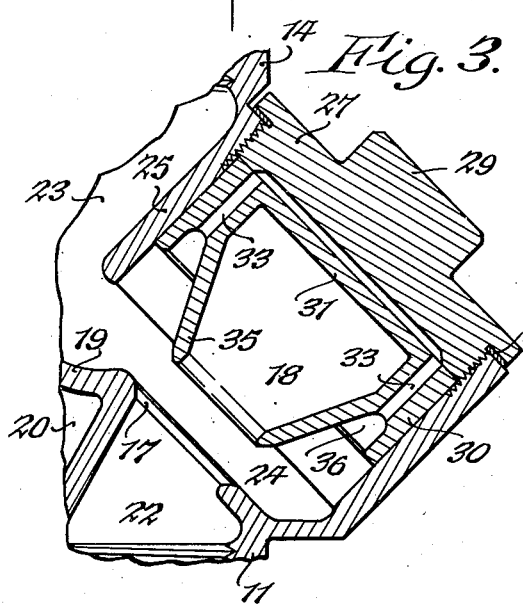
Fig. 4.
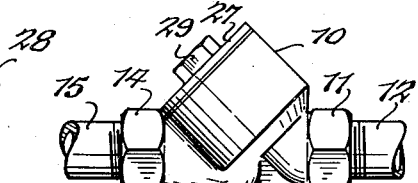
INVENTOR
William W. Smith
BY
Parker, Rockwell & Farmer.
ATTORNEYS Patented Oct. 19, 1943

2,332,406

UNITED STATES PATENT OFFICE 2,332,406

CHECK VALVE

William W. Smith, Buffalo, N. Y.

Application September 12, 1941, Serial No. 410,571

3 Claims. (Cl. 251—128)

This invention relates to improvements in check valves.

Most check valves now available require considerable pressure in excess of that acting on the valve to seat it, in order to move the valve from its seat, and these valves also seat with considerable force, causing pounding of the valves on their seats. This results in much objectionable noise and the pounding also damages the valve seat. In most of these prior check valves it is also difficult to provide an accurately made seat so that the valve will form a fluid-tight closure with its seat.

One of the objects of this invention is to provide a check valve of improved construction which opens when the fluid pressure tending to open the valve is only slightly in excess of that acting on the valve to close it. Another object is to provide a check valve of this kind in which a dashpot retards the movement of the valve toward and from its seat, and in which the flow of fluid past the seat when the valve is slightly open, acts on the valve to quickly open it fully against the action of the dashpot. A further object of this invention is to provide a valve of this kind in which the cylinder of the dashpot is a part of the housing and in which the end or head of the dashpot cylinder is removable, so that the valve seat and dashpot cylinder may be accurately machined concentric with a common axis. A further object is to provide a check valve of this kind which is so constructed that when the cap or head of the dashpot or valve guide is removed, the movable valve member may be rotated so that the ground fit may be formed between the valve member and its seat. It is also an object of this invention to provide a valve in which the housing is so constructed that all fluid conducting passages therein have a cross sectional area at least equal to that of the pipes conducting fluid to and from said valve.

Other objects and advantages of this invention will be apparent from the following description and claims.

In the accompanying drawing which illustrates by way of example one embodiment of this invention:

Fig. 1 is a longitudinal central sectional elevation of a check valve embodying this invention;

Fig. 2 is a sectional view thereof on line 2—2 Fig. 1;

Fig. 3 is a fragmentary central sectional elevation of a part of the check valve, showing the movable valve member in open position;

Fig. 4 is an elevation of the check valve on a reduced scale showing the same when installed in connection with a horizontally extending pipe;

Fig. 5 is a perspective view of an implement for use in rotating the movable valve member in the housing for forming a ground fit between the movable valve member and its seat.

The check valve may have a housing of any suitable shape or form, the housing 10 shown being provided at one end with an inlet opening formed in a suitable connecting or coupling device 11 which is adapted to be coupled with a pipe or tube 12, this being accomplished in the usual manner by forming an internal pipe thread in the inlet portion 11 of the housing, which may cooperate with a corresponding external thread on the tube 12. The discharge opening in the valve is formed in a similar manner by means of an internally threaded part 14 on the housing adapted to be coupled to a discharge pipe 15. The interior of the housing is hollow to form a passage leading from the inlet opening to the discharge opening thereof. In this passage an annular seat 17 is formed which is adapted to cooperate with a movable valve member 18. The valve seat 17 is arranged at an angle to the length of the housing, this angle being preferably approximately 45°. A portion of the wall of the valve housing as shown at 19 extends inwardly to the valve seat 17 and if desired, a web 20 may extend across this portion of the housing. The interior of the housing is consequently divided into an inlet chamber or passage 22 extending from the inlet opening of the housing to the valve seat, and a discharge chamber or passage 23 extending from the valve seat to the discharge opening of the housing. The chamber 23 is provided with an annular extension 24 extending about the valve seat 17.

The valve housing is also provided with a guide for the movable valve member 18, this guide in the construction shown, being in the form of a cylinder 25 which also extends at an angle of approximately 45° to the axis of the inlet and outlet openings, and the interior of this cylinder 25 is coaxial with the valve seat 17. This cylinder 25 is preferably formed integral with the valve housing and is provided at its outer end with a removable closure or cap 27 which may be secured to the cylinder 25 in fluid-tight relation thereto in any suitable or desired manner. In the construction shown, the outer end of the cylinder 25 is internally threaded to cooperate with a correspondingly threaded portion of the cap or closing member 27 and a gasket 28 is positioned between the cap and the end of the cylinder to form a fluid joint between these two parts.

The cap or closure member may be provided with a hexagonal head 29 or other suitable means by which the cap 27 may be screwed tightly on the cylinder 25.

The movable valve member 18 is provided with a cylindrical skirt 30 which fits slidably within the guide cylinder 25, and the outer end of the movable valve member 18 is provided with a transverse wall or head 31 connected with or formed integral with the skirt portion 30. Fluid under pressure from the discharge chamber 23 of the valve housing may be admitted in any suitable manner into the head portion of the cylinder 25 to act on the head 31 of the movable valve member in a direction to urge the valve member 18 toward its seat. In the construction shown, the valve member 18 is provided with a plurality of holes or passages 33 which extend from the discharge chamber 23 to the space between the cap 27 and the head 31 of the valve member 18. Preferably the cylinder 25 forms with the movable valve member a dashpot for retarding the movement of the valve member 18 toward or from its seat and if this dashpot effect is desired the holes 33 are of relatively small diameter to retard the flow of fluid therethrough to the extent desired to produce the proper dashpot effect.

The movable valve member 18 is provided with a portion which extends toward and cooperates with the seat 17 of the housing. In the particular construction illustrated this portion 35 of the valve member 18 is of tapering or substantially frusto-conical form converging toward the seat 17. The larger end of the portion 35 is formed integrally with the skirt 30 of the valve member 18 and preferably extends to a portion of the skirt approximately midway of its ends, thus forming an annular groove 36 between the inner portion of the skirt 30 and the tapering portion 35.

As a result of the construction described, it will be obvious that the cylinder 25 of the housing 10 guides the movable valve member 18 toward and from its seat 17. If the holes or passages 33 are of relatively small cross-sectional area, then the cylinder also forms a dashpot with the valve member 18, which retards or cushions the movement of the valve member toward and from its seat. This dashpot effect is particularly desirable when the valve member 18 moves into its closing position so that this valve member will not pound against the seat 17, thus avoiding the objectionable hammering noise which would result if the movement of the valve member toward its seat were not retarded. Consequently my improved check valve is quiet in its operation and the gentle seating of the valve member 18 greatly reduces the wear on the seat, thus greatly increasing the life of my improved check valve.

It is of course desirable under many conditions to have the check valve open easily and quickly, so that the flow of fluid past the seat will not be materially retarded by the slow opening of the valve due to the dashpot. In my improved check valve as shown and described, the movement of valve member 18 to its wide open position is accelerated by the construction of the valve member 18. It will be obvious from the construction shown in the drawing that when the valve member moves from its seat into a slightly open position, the rush of fluid past the seat along the inclined surfaces of the tapering portion 35 of the valve member and into the annular recess 36 exerts a force on the valve member 18 in a direction to accelerate the movement of this valve member into its wide open position, shown in Fig. 3.

The construction described also has the advantage that the seat 17 may be formed of a diameter equal to the inside diameter of the pipes 12 and 15 with which the check valve cooperates. Consequently the check valve, when in its open position offers very little resistance to the flow through the housing 10, which avoids excessive heating of the check valve. As will be seen in Fig. 3, a relatively large space or clearance is provided between the valve member 18 and its seat when the valve member is in open position, and the tapering portion 35 of the valve member also helps to deflect fluid which has passed the seat outwardly into the chamber 23 and then into an enlargement 24 thereof. Since the valve member 18 in the construction shown seats by gravity, the check valve will operate when the pressure in the chamber 22 is only slightly greater than that in the discharge chamber 23 and such slight pressure will serve to maintain the valve in its fully open position as shown in Fig. 3. Because of the enlarged interior of the movable valve member, it has been found that if a sudden flow of fluid is admitted to the inlet opening 11 at a pressure slightly less than that in the discharge chamber 23, the impact of such fluid on the lower face of the head or wall 31 will cause the valve to open. The tapering walls 35 of the movable valve member, consequently, act as a nozzle to direct a jet of fluid against the wall 31 to facilitate opening of the valve at a pressure in the chamber 22 only very slightly more than that in the chamber 23, thus making this valve very efficient and easy to operate. While the valve shown is intended to seat by gravity, it is obvious that, if desired, a compression spring or other desired resilient means may be provided in the space between the head 31 of the valve member and the cap 27, to act in a direction to move the valve toward its seat.

The construction described also has the advantage that because of the angular arrangement of the cylinder 25 with relation to the length of the valve, the clearance between the inner end of this cylinder and the opposite housing wall can be made as large as desired. For example, in the construction shown, the cross-sectional area of the chamber 23 between the inner end of the cylinder 25 and the opposite wall of the housing 10 is equal to the area of the valve opening within the seat 17, and equal to the internal area of pipes with which the valve is designed to cooperate.

My improved valve also is so constructed that it can be readily made with a high degree of accuracy. Since the inner face of the cylinder 25 must be machined concentrically with the valve seat 17, the cylinder 25 may be used as a guide for a tool forming the valve seat. Also, by means of my improved construction the valve may be ground into a fluid-tight connection with its seat. By removing the cap 27 and the valve member 18, and applying to the seat portion 17 a suitable abrasive or grinding composition, and then restoring the valve member 18 into the position shown in Fig. 1, and rotating the same in any suitable or desired manner, the valve may be ground into correct relation to its seat. During this grinding operation, the cylinder 25 acts as a guide to hold the movable valve member in correct relation to its seat. A fitting, as illustrated in Fig. 5, may be provided for rotating the valve member 18 during grinding, said fitting having a series of pins or projections 40 extending outwardly therefrom and arranged so that these pins may enter into the holes 33. The implement may have a stem portion 41 by means of which it may be turned. Consequently, the valve may be ground into its seat without requiring any special grinding tool, and while accurately held in coaxial relation to the cylinder 25 and the seat 17, thus assuring the forming of a fluid-tight fit of the valve on its seat. This grinding operation consequently requires no skill and may be used not only during the manufacture of the valve, but also whenever regrinding is required during the life of the valve.

I claim as my invention:

1. A check valve including a housing having inlet and discharge openings at opposite ends thereof, a valve seat arranged at an inclination to the direction of flow of fluid through said openings, a guide cylinder in said housing substantially coaxial with and spaced from said seat and of materially larger diameter than said seat, a movable valve member having a hollow piston portion arranged to slide in said cylinder and having a head at one end, and a hollow tapering portion terminating at its end of larger diameter in said piston and having its end of smaller diameter open and formed to cooperate with said valve seat, to permit fluid from said inlet to enter into said hollow piston, and a passage connecting the discharge portion of said valve with the head end of said guide cylinder, to permit the piston and cylinder to act as a dash pot on opening and closing of said valve.

2. A check valve including a housing having inlet and discharge passages therein arranged substantially in alinement with each other and terminating in openings in opposite ends of said housing, a valve seat in said housing separating said passages and arranged at an angle thereto, a valve member for cooperating with said valve seat and including a substantially frusto-conical portion having its end of smaller diameter formed to cooperate with said valve seat and having its end of larger diameter terminating in a cylindrical piston, said valve being hollow and being open at the portion thereof of smaller diameter facing said inlet passage, a cylinder formed integral with said housing and concentric with said valve seat and formed to receive said piston, a removable cap on the outer end of said cylinder, said valve and piston being movable out of the open end of said cylinder when said cap is removed therefrom, vent passages communicating with said discharge passage of said housing and with the head portion of said cylinder for enabling said piston to act as a dash pot in said cylinder to retard the movement of the valve toward its seat, said cylinder also serving to guide said valve in its movement toward and from its seat.

3. A check valve including a housing having inlet and discharge passages therein arranged substantially in alinement with each other and terminating in openings in opposite ends of said housing, a valve seat in said housing separating said passages and arranged at an angle thereto, a guide cylinder formed on said housing and arranged coaxially with and spaced from said seat and of materially larger diameter than said seat, and a hollow movable valve member in said housing, said valve member being of unitary structure and including a piston portion formed to cooperate with said guide cylinder to move toward and from said seat and forming with said cylinder a dash pot for cushioning the movement of said valve toward said seat, said valve also having an integral frusto-conical portion extending from said piston portion toward said valve seat and having its portion of smaller diameter formed to cooperate with said seat and being open to permit fluid from said inlet passage to enter into the interior of said hollow valve, said piston portion of said valve having a passage therein connecting said discharge passage with the head of said cylinder to restrict the rate of flow of fluid flowing into and out of said cylinder during movement of said valve toward and from said seat.

WILLIAM W. SMITH.